(12) United States Patent
Conte et al.

(10) Patent No.: US 6,494,457 B2
(45) Date of Patent: Dec. 17, 2002

(54) ENHANCED HIDE AND SEEK GAME AND METHOD OF PLAYING GAME

(76) Inventors: Shelly Conte, 9837 N. Granville Ave., Fresno, CA (US) 93720; Cindy Reichman, 9837 N. Granville Ave., Fresno, CA (US) 93720

( * ) Notice: Subject to any disclaimer, the term of this patent is extended or adjusted under 35 U.S.C. 154(b) by 0 days.

(21) Appl. No.: 09/915,940

(22) Filed: Jul. 25, 2001

(65) Prior Publication Data

US 2002/0014742 A1 Feb. 7, 2002

Related U.S. Application Data

(60) Provisional application No. 60/220,946, filed on Jul. 26, 2000.

(51) Int. Cl.[7] .................................................. A63H 5/00
(52) U.S. Cl. ...................................................... 273/460
(58) Field of Search .............................. 273/460; 463/1, 463/40, 41, 42

(56) References Cited

U.S. PATENT DOCUMENTS 6,311,982 B1 * 11/2001 Lebensfeld et al. ......... 273/460
6,364,315 B1 * 4/2002 Velke, III .................... 273/460

* cited by examiner

*Primary Examiner*—Marguerite McMahon
(74) *Attorney, Agent, or Firm*—Richard A. Ryan

(57) ABSTRACT

An enhanced game of hide and seek where the game participant searches for a hidden object having a transmitter device inside or attached to the object. The game participant utilizes a seeker unit that determines the distance between the object and the participant before and after the participant moves. The seeker unit uses that information to determine whether the participant is moving closer to or further away from the object and then communicates useful information to the game participant to assist the participant in finding the object. The participant interacts with the seeker unit to use and develop his or her logical reasoning skills in searching for the hidden object. The object can be a doll, stuffed animal, toy or any variety of other objects suitable for hiding and fun for finding.

15 Claims, 3 Drawing Sheets

ENHANCED HIDE AND SEEK GAME AND METHOD OF PLAYING GAME

REFERENCE TO RELATED PATENTS

This patent claims priority based on U.S. Provisional Application No. 60/220,946 filed Jul. 26, 2000.

BACKGROUND OF THE INVENTION

A. Field of the Invention

The field of the present invention relates generally to children's toys and games. More particularly the present invention relates to those games that are enhanced versions of the game of hide and seek. Even more particularly, the present invention relates to such games that utilize an object, such as a doll, stuffed animal, toy or other such object, that is hidden and which communicates its relative position to the person seeking the toy or object.

B. Background

The game of hide and seek has likely been around for a very long time. In fact, most people have played the game of hide and seek, either when they were a child or as an adult in conjunction with children. The standard game of hide and seek requires two or more participants with one participant being the seeker and the other participant(s) hiding so the seeker cannot easily find them. Typically, the seeker will hide his or her eyes to give the other participants a chance to hide. Once the allotted time has gone by for the others to hide, the seeker will begin seeking out the other participants. When the seeker is able to find and touch another participant, that participant becomes the next seeker and the game is repeated. There are numerous variations of the standard game where rules are made to increase or decrease the difficultly of play. One such variation on the standard hide and seek game is where one person (often a parent or older sibling) hides an object, such as a doll, stuffed animal or toy, so that another person (i.e., a child) can try to find the object. Typically, the person who hid the object will watch the person seeking the object and give clues as to the location of the hidden object, usually in reference relative to the seeker's position and often in the vague form of whether the seeker is cold, warm or hot. Based on the clues, the seeking participant uses his or her logic skills to determine the object's location.

One limitation of the standard game of hide and seek is that the game requires at least two persons (whether both are children or one is a parent or other adult) to participate, one as the seeker and one who hides. If only two participants are playing the standard hide and seek game, the one hiding is unable to give any clues as to his or her position without the sound of the clues, as opposed to the words themselves, giving away the hider's location. In fact, with only two people playing hide and seek, the modified game (i.e., where an object is hidden and clues are given) is usually the game of choice for younger children due to their inability to find a well-hidden hider. Naturally, without a second person to do the hiding or seeking, either the standard or modified game of hide and seek cannot be played. With young children at home, often it is the parent who plays as the other participant. Even well meaning parents, however, are generally limited on the amount of time and patience they have available for playing such a game. Usually, the parent will tire of the game before the child does.

For traditional hide and seek games, the number of players to make the game fun generally depends on the size of area where the game is played and the number of places to hide. If the area is small with not too many places to hide, the game is generally more fun with fewer players. Otherwise, the game is not very much fun because it is too easy to find the hidden participants. In contrast, if the playing area is large with many places to hide, the game is generally much more fun with more participants. This is particularly true for a game being played in a large area with only a young seeker and a single hidden child, which would be too difficult to be fun.

A number of modern variations of the game of hide and seek have been developed and/or patented to incorporate modern electronic technology into devices to be used to play the game. One such game is "Hide 'n Sneak" that utilizes a seeker unit and one or more "hider" units that are worn by the person seeking and the person hiding, respectively. When the seeker comes within a preset distance of the hider, the seeker unit picks up a signal transmitted by the hider unit to let the seeker know he or she is close to a person hiding. As the seeker gets closer to the hidden person, the seeker unit uses a variety of lights and/or sounds to indicate the relative closeness to the person hiding. As such, the game basically replaces visual seeking with sonar-type seeking. Another game is called "Hide 'n Squeak" by Milton Bradley. In this game, an object such as a kitten or puppy with a transmitter inside is hidden. The object transmits a "cute" sound every few seconds for the child to follow. Skill level is adjusted by setting how often the object transmits the sound. Other than listening for the sound of the object, there is no other interaction between the seeker and the object. Another available game utilizes the Freddie Fish® character in a toy format, treasures for hiding and a tracking device. The character toy emits different phrases to guide the seekers to the hidden treasures. Other than listening to the phrases emitted by the toy, no other interaction takes place between the child and the toy. One common aspect of the above-mentioned games is that none of them provide much of an opportunity for the seeker to use and develop his or her logic skills. The interaction between the seeker and the hidden objects is generally very minimal and the seeker merely has to follow the sound of the devices to determine where they are located.

U.S. Pat. No. 4,961,575 to Perry discloses a hide and seek game that utilizes a radio receiver for the seeker and radio transmitters for those who are hiding. Each transmitter emits a radio signal that is picked-up by the receiver, which measures the field strength of the cumulative signal field generated by the transmitters. The receivers and transmitters can be configured in the form of a wrist watch sized device to be worn on the players' person. The transmitters also include a feature to allow them to be temporarily turned off. This game, like the traditional game of hide and seek, requires two or more participants. In addition, the game devices appear to be less suitable for very young children due to the need to understand the effect of multiple radio signals. A similar type of game is disclosed in U.S. Pat. No. 5,942,969 to Wicks. This patent describes a treasure hunt type of game that utilizes pagers and a wireless paging system. The participants decipher clues to determine which location they need to go to next. Once there, they signal the base pager station that they are there and then they receive the next clue. This game requires interaction with a wireless paging system and is not configured for young children.

While the foregoing describes certain hide and seek and related games that are available or have been previously patented, none of the games provide a hide and seek game that can be played by a single participant (once the object is hidden) and which interacts with the participant. The ability to provide a participant, particularly young children, with a hide and seek game that both entertains and helps develop the participant's thinking abilities would be beneficial to most parents. As is well known, a child playing by his or herself or even with other children often becomes bored and wants a parent to interact in a game with the child or children. The level of interaction desired by the child or children often is not possible due to work or other activities engaged in by the parent. Although the parent wants to keep the child or children busy, he or she desires to have something that interacts with the child and makes the child use and further develop thinking skills. What is needed, therefore, is a hide and seek game and interactive apparatus for use with the game that can be played by one or more young children and which provides a level of interaction with the child or children that encourages the child to utilize his or her deductive reasoning skills.

SUMMARY OF THE INVENTION

The enhance hide and seek game and method of playing the game of the present invention provides the benefits and solves the problems identified above. That is to say, the present invention discloses a new and useful hide and seek game and method that can be played by one or more participants, such as young children, and which interacts with the participants playing the game to challenge them to utilize their deductive reasoning skills to find a hidden object. The present invention is easy to play and is suitable for use with a variety of commonly available objects as,the object to be hidden and utilizes commonly available technology. The preferred embodiment of the present invention is set forth in the discussion below. However, it should be understood that the principles set forth below with regard to the present invention are equally adaptable to other configurations.

In its preferred configuration, the enhanced hide and seek game of the present invention utilizes an object to be hidden and a seeker unit to be worn or held by the participant seeking the hidden object. The object to be hidden has a transmitter unit either built into the object, attached to the object or otherwise associated with the object. In the preferred embodiment of playing the game the transmitter unit associated with the object is activated and the object is hidden so the game participant will have to find it. The seeker unit is activated and communicates an initialization message (such as laughing, steps running away or the like) to the game participant. The microprocessor in the seeker unit then determines a first distance between the participant and the object based on the first position of the participant. After the participant moves, he or she can initiate a position request by speaking into the seeker unit or pushing a button, flipping a switch or otherwise activating a device on the seeker unit to cause it to determine a second distance, based on the participant's second position, between the seeker unit and the transmitter unit. The microprocessor in the seeker unit compares the second distance to the first distance to determine a relative change in distance and whether the second distance is greater or less than the first distance. Based on that determination, the seeker unit communicates a game message to the game participant regarding the change in distance (i.e., whether he or she is getting closer or further away from the object). The participant then moves again and repeats the procedure for the next position he or she desires to check until the object is found. When the participant gets very close to the object, the seeker unit can communicate an end message (such as "you've found me" or the like) to indicate that the participant has found the object.

In the preferred embodiment of the game of the present invention, the game comprises an object capable of being hidden, a transmitter unit associated with the object and a seeker unit associated with the game participant. The transmitter unit is configured to transmit a signal generally outward from the object such that it can be received by the receiver in the seeker unit. The seeker unit has a microprocessor suitable for determining a relative first distance between the seeker unit (the participant) and the object based on the signal strength of the signal from the transmitter. The microprocessor in the seeker unit also determines the relative second distance between the seeker unit and the object and the relative change in distance between the first distance and the second distance to determine if the participant is generally moving closer to the object or further away from it. The seeker unit also has a speaker for transmitting one or more messages to the game participant, such as an initialization message at the beginning of the game, various game messages during the game to encourage or help the participant find the object and an end message at the end of the game for when the participant finds or is very near the object. In the preferred embodiment, the seeker unit has a voice activated sensor to initiate the distance determination and/or messages. Alternatively, a push button, switch or similar device can be used to activate this procedure.

Accordingly, the primary objective of the present invention is to provide a hide and seek game and apparatus for use therewith having the features generally described above and more specifically described below in the detailed description of the preferred embodiments. It is also an important objective of the present invention to provide a hide and seek game and apparatus that utilizes a doll, toy or other object that can be hidden and then communicates with the seeking child. Yet another important object of the present invention is to provide a method of playing a hide and seek game that can be easily played by one or more participants as the seeker or seekers and which includes an object that interacts with the seeker or seekers to challenge them to find the hidden object. Another object of the present invention is to provide an enhanced hide and seek game and apparatuses that can determine the seeker's relative position to a hidden object and provide clues as to the location of the object. The above and other objectives of the present invention will be explained in greater detail by reference to the attached figures and the description of the preferred embodiment which follows.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiments of the present invention illustrated in the attached figures, the preferred embodiments of the game and apparatus of the present invention are set forth below. Although the preferred embodiments of the present invention are set forth in the following description, it should be understood that the principles set forth below with regard to the present invention are equally adaptable to other configurations.

Figure 1:
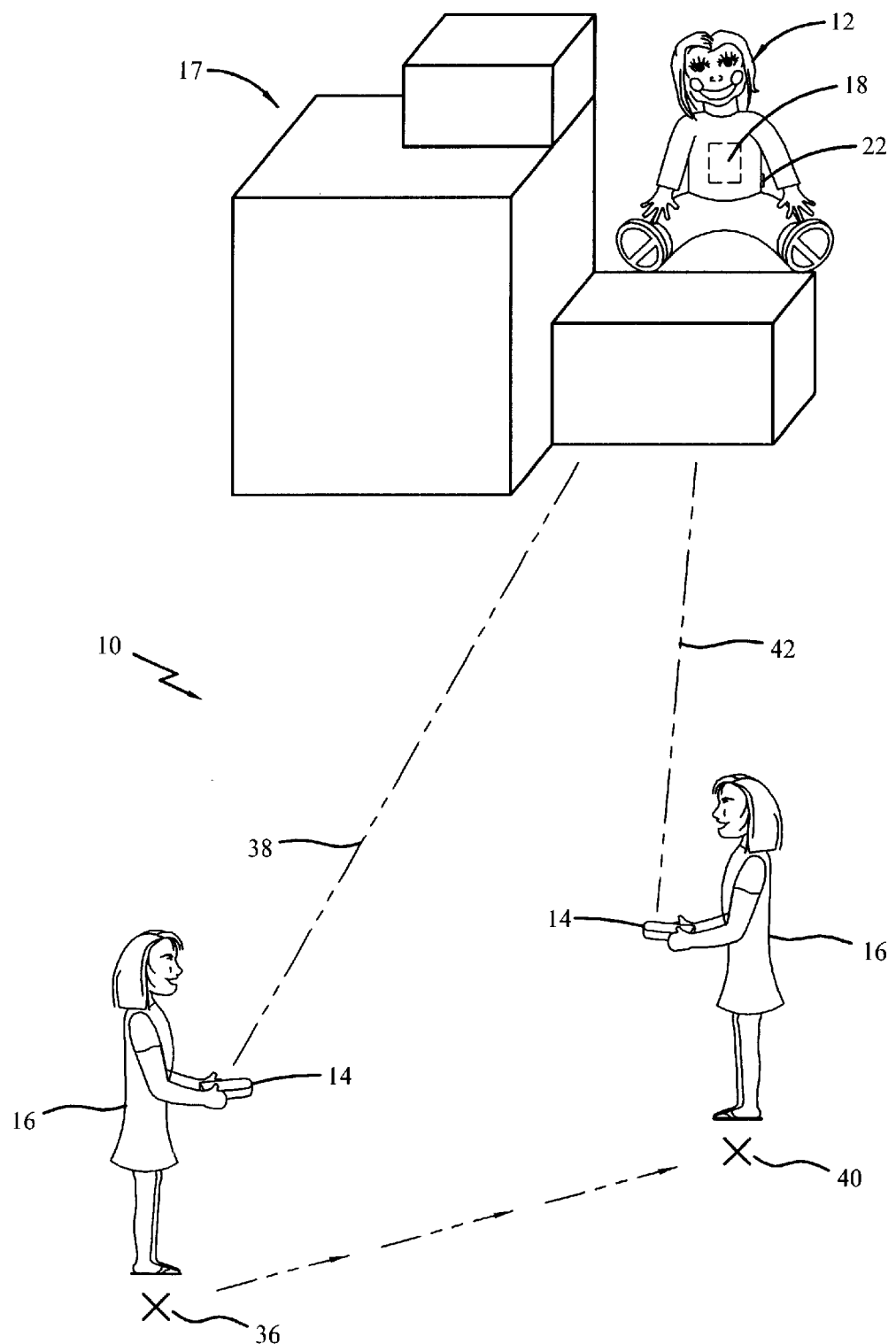
FIG. 1 illustrates a participant playing the hide and seek game in accordance with an embodiment of the present invention.
Figure 2:
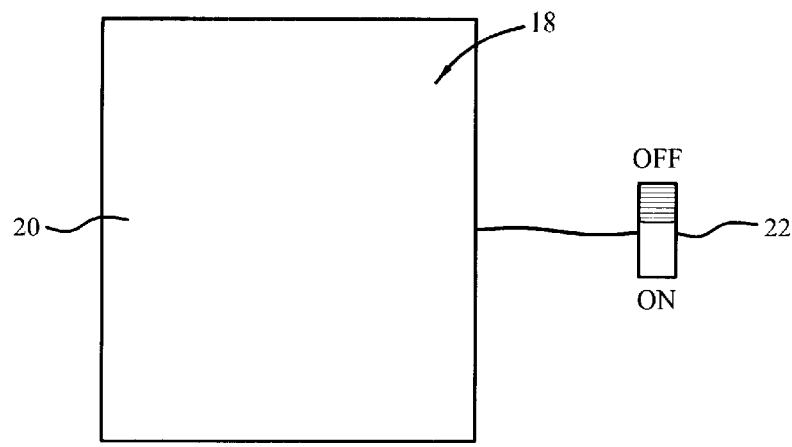
FIG. 2 is an illustration of a transmitter for use with one embodiment of the present invention.

The preferred embodiments of the game of the present invention, shown generally as 10 in FIG. 1, comprises an object 12 to be hidden and at least one seeker unit 14 to be utilized by the game participant 16, which will be the child, children or other persons' seeking the hidden object 12. In FIG. 1, object 12 is a doll that is hidden behind a group of boxes 17, which is shown merely as an example of the type of place in which object 12 can be hidden. Object 12 can be a doll (as shown), stuffed animal, toy, ball or any other type of object that would be appealing for the target game participants 16 to seek out. For instance, object 12 can be a stuffed animal for very young children, a doll for slightly older children, a character toy for older children or a teen or adult-orientated object for teenagers or adults. For purpose of the discussion herein, it should be understood that object 12 can be one of many "toy" or toy-like objects that are suitable for use as the hidden object 12. Other than being modified to incorporate the material required for the present invention, as described below, object 12 can be otherwise configured to be of the type of commonly available dolls, stuffed animals, toys or other objects, including those which resemble or are intended to simulate various characters from books, music, movies or other sources. Also, although perhaps less appealing to certain game participants, object 12 can be as simple as a small metal or plastic housing 20, as shown in FIG. 2. In a preferred embodiment, object 12 is made to be of a size that is reasonably easy to hide, flexible enough (if not very small) to fit behind or in many places and of the type that is fun to play with. For instance, if the game is configured for a young child, then the child can use his or her imagination to pretend object 12 is hiding from him or her.

A transmitter device 18, shown best in FIG. 2, that is capable of continuously transmitting a signal to the seeker unit 14 is associated with object 12 so that the seeker unit 14 can determine how close the game participant 16 is to the hidden object 12, as described in more detail below. As is known in the art, transmitter unit 18 can be incorporated inside object 12, on the outside of object 12 or incorporated into or on an accessory of the object 12 (i.e., if object 12 is a doll, the accessory can be a purse attached to the doll). Naturally, the size of object 12 will, to some extent, dictate the size of the transmitter unit 18. Unlike several of the prior art devices described above, however, the preferred embodiment of the present invention 10 utilizes a transmitter unit 18 that does not speak or emit any sound from object 12. Instead, object 12 merely transmits a signal that is received by the one or more seeker units 14. As described below, this increases interaction with the game participant 16, forces participant 16 to better utilize and develop his or her cognitive thinking skills and makes the game much more fun (by not making it too easy or too hard, particularly for young children). As is known and commonly available in the art, the preferred embodiment of the apparatus of the present invention utilizes a transmitter 18 in object 12 that is battery powered. Object 12 should have an on/off switch 22 somewhere thereon that is operatively connected to transmitter 18 to turn transmitter 18 off to conserve the battery power when the hide and seek game 10 is not being played.

Figure 3:
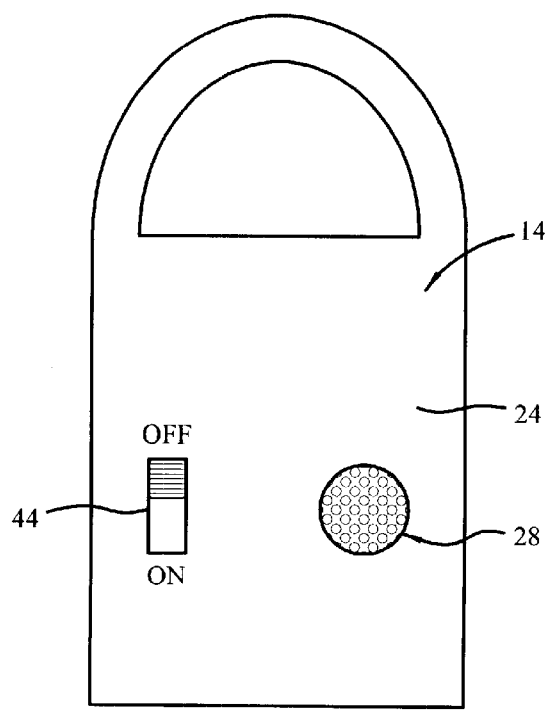
FIG. 3 is an illustration of a seeker unit for use with one embodiment of the present invention.
Figure 4:
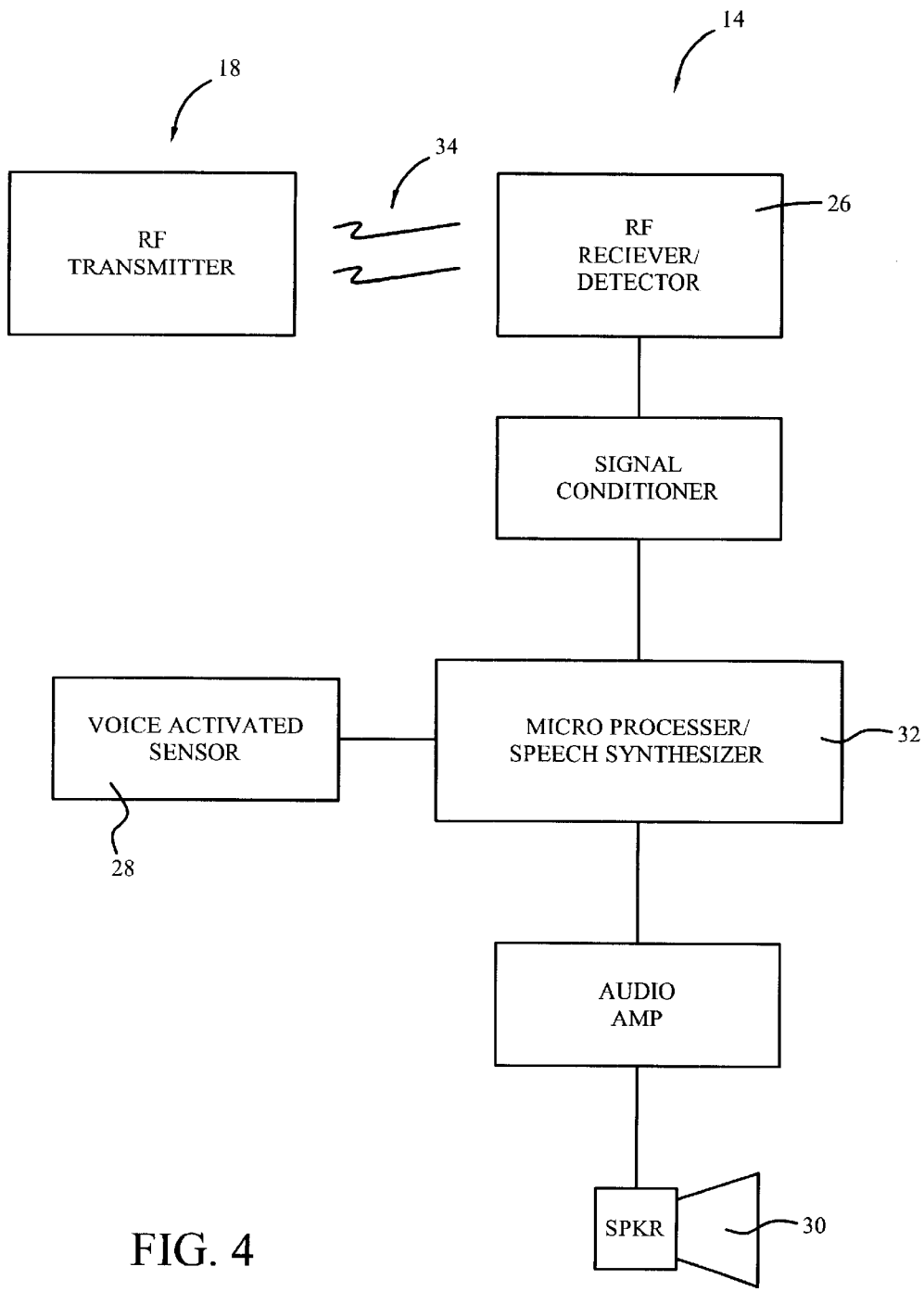
FIG. 4 is a block diagram of the apparatus for use with the game of the present invention.

As shown in FIGS. 3 and 4, the seeker unit 14 of the preferred embodiment of the present invention 10 has a housing 24 with a receiver 26, a voice activated sensor 28, speaker 30 and associated microprocessor circuitry 32 located in housing 24. Preferably, housing 24 should be small enough to fit into a child's hand, be worn on a strap around the child's neck (as shown in FIG. 1) or be able to be clipped to the child's clothing. Alternatively, seeker units 14 having different sized housings 24 for different sized participants 16 can be made available. One such configuration for the housing 24 is a pager-sized unit that can be made out of a fluorescent plastic material or other materials that appeal to particular participants 16, such as children.

The receiver 26 in housing 24 receives the signal 34 transmitted by transmitter 18 in object 12 and processes the signal 34 to determine the relative proximity of the object 12 to the participant 16. Initially, such as when the seeker unit 14 is activated and/or the participant is at a first position 36, the seeker unit 14 receives the signal 34 from transmitter 18 and determines a first distance 38 between the participant 16 and object 12. This first distance 38 amount is stored in the seeker unit 14. After the participant 16 moves to a second position 40, he or she activates seeker unit 14 causing it to perform another distance calculation at second position 40 to determine second distance 42. Seeker unit 14 then compares the second distance 42 to the first distance 38 and determines a change in distance amount (i.e., second distance 42 minus first distance 38). Seeker unit 14 then processes the change in distance to determine whether the participant 16, who is now at second position 40, is closer or further away from object 12 than he or she was at first position 36. In addition, seeker unit 14 should be configured such that it stores and tracks the most recent proximity determinations to be able to determine if participant 16 is getting relatively closer or farther away from object 12 over a period of several positions. It is not necessary that seeker unit 14 of the present invention 10 be able to calculate the actual distance (i.e., in feet and/or inches) between object 12 and participant 16. Instead, it is only necessary that seeker unit 14 be able to measure the relative strength of signal 34, with the weaker signals 34 indicating seeker unit 14 (and therefore participant 16) is further away from object 12 and stronger signals 34 indicating participant 16 is closer to object 12.

Depending on how close or how far away participant 16 is to object 12, seeker unit 14 will say a game message, comprising one of various phrases, to participant 16 that is appropriate for his or her relative closeness to object 12. For instance, if participant 16 has moved further away from object 12 the seeker unit 14 could speak the phrase "you are cold" or "you are getting colder" (or similar phrases) and as participant 16 moves closer to object 12, the seeker unit 14 could transmit the phrase "you are getting warmer" or "you are warm" or other such phrases to let participant 16 know he or she is getting closer. Later, when participant 16 gets very close to object 12, as determined by the distance calculations, seeker unit 14 can transmit one or more game messages that comprise appropriate phrases such as "I can see your feet" or "wow you are really hot" (depending on the type of object 12) which indicate how very close the participant 16 is to object 12. When participant 16 is basically at object 12, the seeker unit 14 can communicate an end message that says "you have found me" or which squeals in delight or make other indications of having been found (as appropriate for object 12). As with the transmitter 18 in object 12, seeker unit 14 should be battery powered and include an on/off switch 44 to conserve power when the game 10 is not being played.

In the preferred embodiment of the present invention 10, participant 16 activates the measurement calculation/determination by seeker unit 14. In a preferred embodiment, as shown in FIG. 4, the present invention 10 includes a voice activated sensor 28 in seeker unit 14 is configured to initiate the information processing described above. Specifically, when participant 16 speaks into or toward seeker unit 14, seeker unit 14 will receive signal 34 from transmitter 18 and, with microprocessor 32, determine the relative distance between participant 16 and object 12 and the change in distance. The voice activated sensor 28 is preferred due to the enhanced interaction that the participant 16 will have with game 10. After processing the signal 34 and determining distance (first 38 or second 42) and the change in distance, the sensor sends the appropriate signal to the speaker assembly which speaks to participant 16 through seeker unit 14. In another embodiment of the present invention 10, seeker unit 14 can comprise a push button, switch or similar device in addition to or instead of the voice activated sensor 28 to activate,the sequence of determining the relative proximity of the participant 16 to the object 12. When participant 16 has moved to a new position (i.e. the second position 40), he or she would push the button, flip or move the switch or otherwise initiate the above sequence.

Technology related to devices necessary for the transmitter and seeker units is set forth in U.S. Pat. No. 5,495,357 to Osterhout; U.S. Pat. No. 5,686,887 to Chen et al.; U.S. Pat. No. 4,285,158 to Courts et al.; U.S. Pat. No. 4,496,149 to Schwartzberg; and U.S. Pat. No. 5,204,657. To the extent that the disclosures set forth in the above-mentioned patents is necessary to understand the configuration or operation of the present invention, that disclosure is incorporated herein as though fully set forth in the present text.

In use, the transmitter unit 18 in object 12 is activated by turning the switch 22 or other on-off device to the on position and then a parent or another person hides object 12 in a location where it cannot be easily seen. Once hidden, the game participant 16 (i.e., the child who will be seeking object 12) activates seeker unit 14 by turning the switch 44 or other on-off device to the on position and begins looking for object 12. If utilized, the seeker unit 14 communicates an initialization message (such as footsteps running away, laughing and/or a statement such as "come and get me") to the participant 16 through speaker 30 in seeker unit 14. In the preferred embodiment, the game participant 16 speaks into the seeker unit 14 and the voice activated sensor 28 causes the microprocessor 32 to determine a first distance 38 that is associated with the participant's first position 36. Alternatively, the game participant 16 will push a button, flip a switch or other action to initiate the determination of the first distance 38 (and later second distance 42). The participant 16 then moves in a direction he or she believes the object to be. When desired, participant 16 stops at a second position 40 and reinitiates the distance determination by seeker unit 14, causing it to determine the second distance 42. The microprocessor 32 in seeker unit 14 then compares the second distance 42 with the first distance 38 to determine a change in distance and whether the change in distance has resulted in the participant 16 being closer or further away from object 12. The seeker unit 14 then communicates a game message to participant 16 through speaker saying a phrase or set of phrases that is appropriate for the change in distance (i.e., that which is indicative of the relative location of object 12). Participant 16 then moves again and the above process is repeated until the participant 16 finds object 12. As such, the game of the present invention 10 is much more interactive for the participant 16 than the games and methods of the prior art. Because object 12 communicates to the participant 16 only through the seeker unit 14, even when the object 12 is "speaking" to the participant, the game 10 eliminates the prior art problems associated with the sound coming directly from object 12, which makes the game too hard (i.e., the child cannot hear object 12) or too easy (i.e., hearing object 12 gives away its position). Because the sounds come out of the seeker unit 12 itself, the participant 16 can always hear it, but it does not give away the location of the object 12. This allows the game 10 to be challenging up to the end. As such, the enhanced hide and seek game of the present invention 10 provides many benefits over the prior art.

Various modifications can be made to the game 10 of the present invention. For instance, as described above, seeker unit can be programmed to communicate end messages to participant 16 through speaker 30 that indicate how close the participant is to object 12. In addition, seeker unit 14 can be configured to continuously determine the distance between the participant 16 and object 12 and indicate to the participant whether he or she is getting closer or wandering away from object 12. Seeker unit 14 can include a visual screen that displays the various initialization, game and end messages in words in addition or as an alternative to speaking the words through the speaker 30. This would encourage the participant to read and would also allow deaf participants to play the game 10. In addition to speaking or displaying end messages when the participant 16 is close to object 12, seeker unit 14 can also transmit other indications of how close the participant 16 is to object 12. For instance, seeker unit 14 can vibrate, flash a light, ring or transmit other sounds that would indicate to the participant that he or she is very close to or has found object 12. In another alternative embodiment, object 12 could comprise a receiver unit that receives signals from the seeker unit 14 or another type of unit. This alternative configuration would allow the participant's parent or the person who hid the object 12 to speak into the device and cause his or her voice to be heard through the speaker in the object 12. This would be useful to further entice the participant to find the object 12 or to "surprise" him or her upon successfully finding object 12. A variation of this embodiment is that object 12 can be configured such that when the participant, and therefore the seeker unit 14, is very close to object 12 it will automatically speak or issue forth a noise or other indication of being found.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the assembly, materials, size, shape, and use set forth herein. For instance, there are numerous components described herein that can be replaced with equivalent functioning components to accomplish the objectives of the present invention.

What is claimed is:

1. A method of playing an enhanced hide and seek game using a seeker unit to search for an object having a transmitter unit, comprising the steps of:
   a. activating said transmitter unit associated with said object;
   b. placing said object in a hidden location;
   c. activating said seeker unit;
   d. transmitting a signal between said transmitter unit and said seeker unit;

e. determining a first distance between said seeker unit and said transmitter unit;

f. determining a second distance between said seeker unit and said transmitter unit;

g. comparing said second distance to said first distance to determine a change in distance and whether said second distance is greater or less than said first distance;

h. communicating a game message from said seeker unit to the game participant regarding said change in distance; and i. repeating steps d through f until said object is found.

2. The method of claim 1 further comprising the step of communicating an initialization message from the seeker unit to the game participant after the step of activating said seeker unit.

3. The method of claim 1 further comprising the step of initiating a request on said seeker unit after determining said first distance.

4. The method of claim 1 further comprising the step of moving said seeker unit from a first position to a second position by the game participant prior to the step of determining said second distance.

5. The method of claim 4 further comprising the step of initiating a position request on said seeker unit after determining said first distance.

6. The method of claim 1 further comprising the step of communicating an end message from said seeker unit to the game participant prior to finding said object.

7. A method of playing an enhanced hide and seek game using a seeker unit to search for an object having a transmitter unit, comprising the steps of:

a. activating said transmitter unit associated with said object;

b. placing said object in a hidden location;

c. activating said seeker unit;

d. transmitting a signal between said transmitter unit and said seeker unit;

e. determining a first distance between said seeker unit and said transmitter unit;

f. moving said seeker unit from a first position to a second position by the game participant prior to the step of determining said second distance;

g. initiating a position request on said seeker unit after determining said first distance;

h. determining a second distance between said seeker unit and said transmitter unit;

i. comparing said second distance to said first distance to determine a change in distance and whether said second distance is greater or less than said first distance;

j. communicating a game message from said seeker unit to the game participant regarding said change in distance; and k. repeating steps d through j until said object is found.

8. The method of claim 7 further comprising the step of communicating an initialization message from the seeker unit to the game participant after the step of activating said seeker unit.

9. An enhanced hide and seek game, comprising:

an object capable of being hidden;

a transmitter unit associated with said object, said transmitter unit configured to transmit a signal generally outward from said object; and a seeker unit associated with the game participant, said seeker unit having a receiver therein for receiving said signal from said transmitter unit; said seeker unit comprising a calculating means for determining a first distance between said seeker unit and said object, a second distance between said seeker unit and said object and a relative change in distance, said seeker unit further comprising a speaker for transmitting one or more messages to the game participant;

wherein after said object is hidden and said transmitter unit is activated, the game participant utilizes said seeker unit to find the location of said object by receiving said messages from said speaker.

10. The game of claim 9, wherein said one or more messages comprises an indicator message indicating said relative change in distance.

11. The game of claim 9, wherein said transmitter unit is inside said object.

12. The game of claim 9, wherein said seeker unit is configured to be carried by the game participant.

13. The game of claim 9, wherein said seeker unit further comprises an input means for receiving a position request from the game participant.

14. The game of claim 13, wherein said input means comprises a voice activated sensor.

15. The game of claim 13, wherein said input means comprises a manually operated switch.

* * * * *